United States Patent
Peden et al.

(10) Patent No.: US 9,112,998 B1
(45) Date of Patent: *Aug. 18, 2015

(54) CALLER NAME DETECTION AND EXPORT

(71) Applicant: Sprint Communications Company L.P., Overland Park, KS (US)

(72) Inventors: Mark Douglas Peden, Olathe, KS (US); Gary Duane Koller, Overland Park, KS (US); Raymond Emilio Reeves, Olathe, KS (US); Simon Youngs, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/133,004

(22) Filed: Dec. 18, 2013

Related U.S. Application Data

(63) Continuation of application No. 13/209,958, filed on Aug. 15, 2011, now Pat. No. 8,644,471.

(51) Int. Cl.
 *H04M 15/06* (2006.01)

(52) U.S. Cl.
 CPC .................................... *H04M 15/06* (2013.01)

(58) Field of Classification Search
 USPC ............. 379/142.05, 142.04, 142.06, 142.09, 379/142.1
 See application file for complete search history.

(56) References Cited

U.S. PATENT DOCUMENTS

| | | | |
|---|---|---|---|
| 6,278,862 B1 * | 8/2001 | Henderson | 340/7.2 |
| 6,298,128 B1 | 10/2001 | Ramey et al. | |
| 7,373,335 B2 | 5/2008 | Cleghorn | |
| 7,664,242 B2 | 2/2010 | Finkelman | |
| 8,284,912 B2 | 10/2012 | Moss et al. | |
| 2006/0093120 A1 * | 5/2006 | Thorpe et al. | 379/218.01 |
| 2007/0263853 A1 * | 11/2007 | Pearson et al. | 379/413.03 |
| 2010/0316198 A1 * | 12/2010 | Balasaygun et al. | 379/88.02 |

OTHER PUBLICATIONS

Final Office Action, mailed Jun. 12, 2013 in U.S. Appl. No. 13/209,958.
Non Final Office Action, mailed Dec. 17, 2012, in U.S. Appl. No. 13/209,958.
How do I use the caller ID spoofing service? SpoofTel Ltd. http://spooftel.com/caller+id+spoofing+faq.html. Copyright 2004-2011 [Accessed from the internet on Jun. 6, 2011].
Answers to Common Questions TeleSpoof.com. http://telespoof.com/faq. Copyright 2011 [Accessed from the internet on Jun. 6, 2011].
Fix Caller ID FAQ Infotel Systems. http://www.fixcallerid.com/faq.html. [Accessed from the internet on Jun. 6, 2011].

(Continued)

*Primary Examiner* — Yosef K Laekemariam

(57) ABSTRACT

Methods, media, and network devices are provided for detecting errors in caller identifier records. A caller name provider is identified for a terminating endpoint that is a recipient of a communication from a transmitting device. The caller name provider receives queries for caller identifier information that will be transmitted to the terminating endpoint. The caller name provider returns records having the caller identifiers in response to the queries. When the records contain an error, the caller name providers receive update requests from a calling party of the transmitting device. The update requests include changes to the records that correct the errors.

16 Claims, 5 Drawing Sheets

(56) References Cited

OTHER PUBLICATIONS

We Fix Caller ID Infotel Systems. http://fixcallerid.com/. [Accessed from the internet on Jun. 6, 2011].
Ready to Spoof Your Caller ID? http://www.spoofcard.com/. [Accessed from the internet on Jun. 6, 2011].
"Privus Mobile Debuts Real-Time Caller ID and Text ID with Voice Announce for BlackBerry" FierceWireless. http://www.fiercewireless.com/press-releases/privus-mobile-debuts-real-time-caller-id-and-t. Posted Sep. 8, 2010 [Accessed from the Internet on Jun. 6, 2011].

* cited by examiner

CALLER NAME DETECTION AND EXPORT

CROSS REFERENCE TO RELATED APPLICATIONS

This application is a continuation of U.S. patent application Ser. No. 13/209,958, filed Aug. 15, 2011, and entitled "Caller Name Detection and Export," which is hereby incorporated, in its entirety, by reference.

SUMMARY

A high-level overview of various aspects of the embodiments of the invention are provided here for that reason, to provide an overview of the patent, and to introduce a selection of concepts that are further described below in the detailed-description section. This summary is not intended to identify key features or essential features of the claimed subject matter, nor is it intended to be used as an aid in isolation to determine the scope of the claimed subject matter.

In brief, and at a high level, this patent describes, among other things, methods, systems, servers, and computer-readable media for detecting and correcting records provided by a caller name (CNAM) provider. A network device may receive a notification having one or more records that are transmitted to a called party. The records include caller identifier information that corresponds to the network device. The name associated with a user of the network device is compared to the caller identifier information. When an error is detected in the caller identifier information, the one or more records are updated.

Accordingly, in some embodiments a caller name detection and export (CANDE) server is configured to leverage a combination of logic executed by a CNAM registry and logic executed by a communication carrier to correct an error detected in the caller identifier information. The logic executed by the network device and the CANDE server identifies errors in records provided by the CNAM provider corresponding to a terminating endpoint. In one embodiment, a CNAM registry may be utilized to identify the CNAM provider for the terminating endpoint. The terminating endpoint is the recipient of request to begin a communication session with the network device. In turn, the terminating endpoint also receives the records from the CNAM provider that include the caller identifier information. A communication carrier may maintain the CANDE server and generate billing records for each request to alter the records stored by the CNAM provider.

BRIEF DESCRIPTION OF THE SEVERAL VIEWS OF THE DRAWINGS

Illustrative embodiments of the invention are described in detail below with reference to the attached drawing figures, wherein.

DETAILED DESCRIPTION

Figure 1:
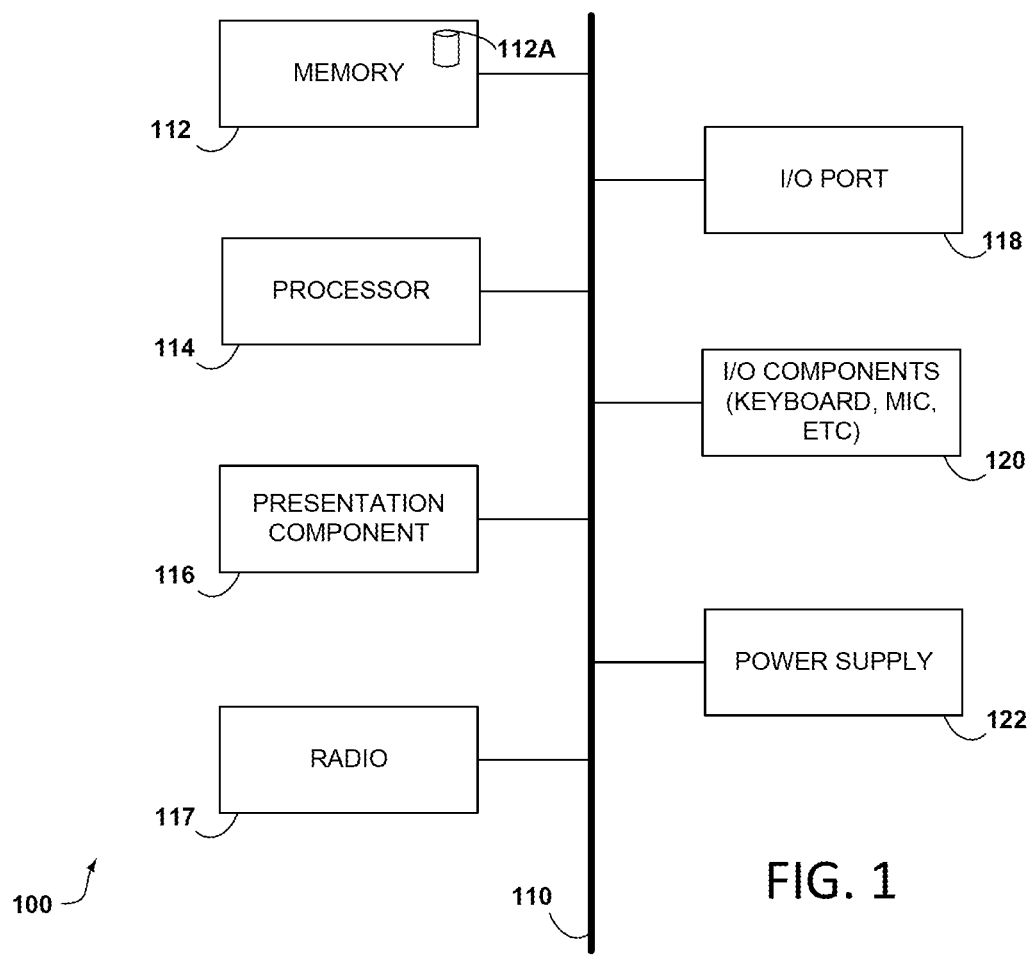
FIG. 1 depicts an illustrative network device suitable for use in connection with embodiments of the invention.

The subject matter of the invention is described with specificity herein to meet statutory requirements. However, the description itself is not intended to define the invention, which is what the claims do. Rather, the claimed subject matter might be embodied in other ways to include different steps or combinations of steps similar to the ones described in this document, in conjunction with other present or future technologies. Moreover, although the term "step" or other generic term might be used herein to connote different components or methods employed, the terms should not be interpreted as implying any particular order among or between various steps herein disclosed unless and except when the order of individual steps is explicitly described.

Embodiments of the invention are directed to network devices configured to receive CNAM records. The network devices may include laptops, multimedia phones, computers, etc. The network devices, in certain embodiments, detect and correct caller identifier information included in CNAM records provided by a caller name provider. A CANDE client executes on the network device and communicates with a CANDE server. The CANDE server provides a calling party on the network device with copies of the CNAM records transmitted to a called party from the CNAM provider. Accordingly, the calling party may request changes to the CNAM records if needed. In turn, a telephone provider may store the requests in a billing log for the network device or calling party.

Embodiments of the invention allow a caller to detect the caller name displayed to the called party. In turn, the caller may update, edit, or correct the caller name in a real-time manner. In conventional communication systems, delivery of caller name to a caller party is inconsistent and unpredictable because the local exchange carrier (LEC) or voice over internet protocol (VOIP) provider neglect to request the caller identifier information from the CNAM provider. Additionally, the CNAM provider may transmit incomplete records for a caller. Accordingly, in certain embodiments, a CNAM server provides a notification to the caller. The notification provides a preview of the caller identifier information supplied by the CNAM provider corresponding to the termination party. Thus, the CNAM server may reduce the likelihood of missed calls, embarrassing situations, and in some cases damages to business prospects due to erroneous or fraudulent caller identifier information.

Throughout this patent, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the embodiments of the invention. The following is a list of these acronyms:

BTS Base Transceiver Station
CANDE Caller Name Detection and Export
CNAM Caller Name
CNARG Calling Name Access Routing Guide
CDMA Code Division Multiple Access
GPRS General Packet Radio Service
GSM Global System for Mobile communications (Groupe Spécial Mobile)
GUI Graphical User Interface
IP Internet Protocol
LEC Local Exchange Carrier
LED Light Emitting Diode
NPAC Number Portability Administration Center
PDA Personal Data Assistant
RNC Radio Network Controller
TDMA Time Division Multiple Access
UMTS Universal Mobile Telecommunications System VOIP Voice Over Internet Protocol Wi-Fi Wireless Fidelity WiMAX Worldwide Interoperability for Microwave Access Embodiments of the invention can take the form of a method, sever, network device, system, or computer-readable media embodied with a specific set of computer-executable instructions. Computer-readable media include both volatile and nonvolatile media, removable and nonremovable media, and contemplate media readable by a database, a switch, and various other network and computing devices. Computer-readable media include communication media and computer storage media implemented in any method or technology that stores information. Examples of stored information include computer-useable instructions, data structures, program components, and other data representations. Examples of computer-readable media include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. The computer-readable media can store data momentarily, temporarily, or permanently.

In one embodiment, the network device is configured with a CNAM client that receives a notification from the CNAM server. The CNAM server may generate the notification in response to a request to initiate a communication, e.g. call, text, instant message, video chat, etc. with a terminating party. The CNAM client may provide a graphical user interface that allows a user of the network device to view the notification, which includes the caller identifier information stored by a CNAM provider. The CNAM client is also configured to edit the caller identifier information. In some embodiments, the CNAM client communicates with the communication carrier corresponding to the network device. The CNAM client may transmit a request to correct the caller identifier information to the communication carrier. In turn, the communication carrier may update the caller identifier information stored by the CNAM provider. Alternatively, the CNAM provider may update the caller identifier information in response to a request from the communication carrier.

FIG. 1 depicts an illustrative device suitable for use in connection with embodiments of the invention. Turning now to FIG. 1, a block diagram of an illustrative network device is provided and referenced generally by numeral 100. Although some components are shown in the singular, they may be plural. For example, network device 100 might include multiple processors or multiple radios, etc. A network device 100 may be one of many devices, including, but not limited to, a wireless phone, video and image capture device, a laptop, a PDA, a handheld device, computer, consumer electronics, etc. As illustratively shown, network device 100 includes a bus 110 that directly or indirectly couples various components together including memory 112, a processor 114, a presentation component 116, a radio 117, input/output ports 118, input/output components 120, and a power supply 122.

We previously have described various memory components that memory 112 might take the form of. Memory component 112 can include any type of medium that is capable of storing information (e.g., a database 112A). The database 112A may be configured to store the caller name that a user intends to associate with network device. The database 112A may also store applications and code associated with the CNAM client installed and executing on the network device 100. Processor 114 might actually be multiple processors that receive instructions associated with the applications and code and process the instructions accordingly. Presentation component 116 includes the likes of a display, a speaker, as well as other components that can present information (such as a lamp (LED), or even lighted keyboards).

The CNAM client utilizes the communication interfaces of network device 100 to receive data from network resources on the communication network. In an embodiment, a graphical user interface generated by the CNAM client may be utilized to initiate a communication and to track the caller identifier information that is provided to the party that receives the communication. In turn, a user of the network device 100 may view the caller identifier information via the CNAM client. If the user desires to change the caller identifier information, the CNAM client includes an update function that allows the user to update the caller identifier in realtime. In one embodiment, the CNAM client may transmit a request to update the CNAM records to a communication carrier. Upon receiving the update CNAM records request, the communication carrier may update the CNAM records directly. Alternatively, when the update CNAM records request is received by the communication carrier, a CNAM provider corresponding to the terminating party of the communication may update the CNAM record in response to the update CNAM records request received from the communication carrier. In another embodiment, the CNAM client may spoof the terminating party by injecting the caller name stored on the network device 100 into the data stream received by the terminating party. The caller identifier information received by the terminating may be replaced by the caller name injected into the data stream. Accordingly, the terminating party may receive the most accurate and up-to-date caller identifier information, including caller name, for a network device 100 that initiated a communication with the terminating party.

In some embodiments, the network resources on the communication network may be a server, a database, or a communication provider that manages access to the communication network by the network device 100. The network device includes a communication interface that may be a radio 117. Radio 117 facilitates communication with a wireless telecommunications network. Illustrative wireless telecommunications technologies include VOIP, CDMA, GPRS, TDMA, GSM, WIMAX, LTE, UMTS, and the like. In some embodiments, radio 117 might also facilitate other types of wireless communications including Wi-Fi communications and GIS communications.

Input/output port 118 might take on a variety of forms. Illustrative input/output ports include a USB jack, stereo jack, infrared port, proprietary communications ports, and the like. Input/output components 120 include items such as keyboards, microphones, touch screens, and any other item usable to directly or indirectly input data into mobile device 100. Power supply 122 includes items such as batteries, fuel cells, or any other component that can act as a power source to power network device 100.

Accordingly, a network device 100 may detect the caller identifier information that is provided to a terminating party. The network device may also correct the caller identifier information. In some embodiments, the network device may receive a notification having the caller identifier information that is provided to the terminating party. It will be understood and appreciated by those of ordinary skill in the art that the network device 100 shown in FIG. 1 is merely an example of one suitable network device 100 and is not intended to suggest any limitation as to the scope of use or functionality of the embodiments of the invention. Neither should the network device 100 be interpreted as having any dependency or requirement related to any single component or combination of components illustrated therein. The single unit depictions are meant for clarity not to limit the scope of embodiments in any form.

A communication system may include a network device, a CANDE server, CNAM provider, and communication provider. The communication system is configured to allow the network device to receive notifications of whether the caller identifier information that is provided to a terminating party matches the caller name associated with the network device. In some embodiments, the notification may be delivered to multiple network devices associated with the caller that initiates the communication with the terminating party.

Figure 2:
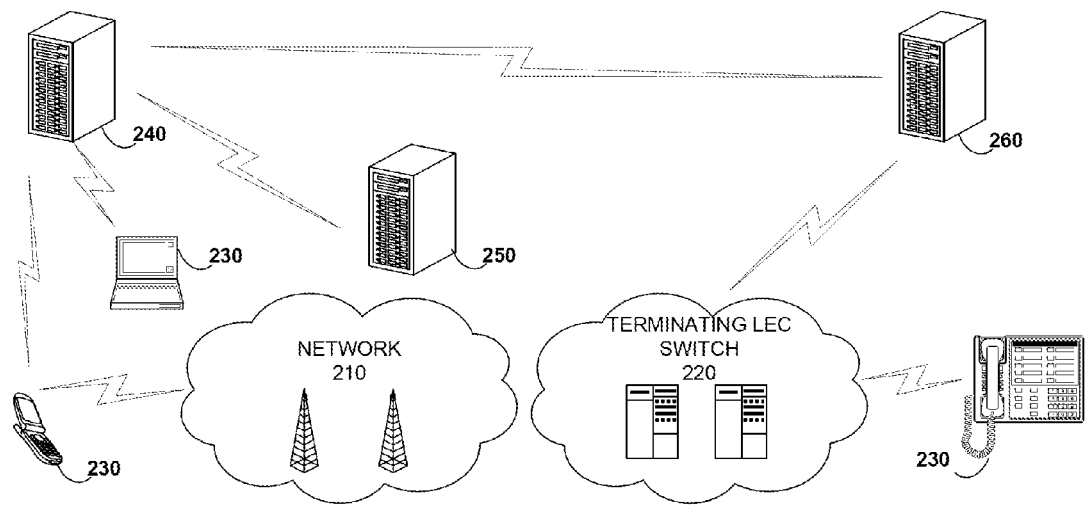
FIG. 2 depicts an illustrative communication system suitable for practicing embodiments of the invention.

FIG. 2 depicts an illustrative communication system suitable for practicing embodiments of the invention. Turning now to FIG. 2, an illustrative communication system is provided and referenced generally by the numeral 200, which depicts an illustrative operating environment for re-provisioning the network device. The communication system 200 may include a network 210, communication switches 220, network devices 230, CANDE server 240, billing center 250, and CNAM provider 260.

Network 210 may be a wired network or a wireless network. The network 210 may facilitate connection over short-range connections, long-range connections, or a combination of both a short-range and long-range wireless telecommunication connections. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi connection to a device (e.g., wireless hotspot) that provides access to a wireless communications network, such as a WLAN connection using 802.11 protocol. A long-range connection may include a connection using one or more of CDMA, GPRS, GSM, TDMA, and 802.16.

Generally, the network 210 may include towers that provide access to what some skilled artisans refer to as a wireless communications network. The wireless communications network may include one or more of a base transceiver station (BTS) tower, a Wi-Fi Router, and any other device that allows communication between network device 230 and network 210. In one embodiment, the wireless communications network includes a radio network controller (RNC) that performs various functions, such as managing radio channels, power control, load control, admission control, packet scheduling, handover control, macrodiversity, security functions, and mobility management. Also, the wireless communication network may include a base station controller that acts as the intelligence behind base transceiver stations and handles allocation of radio channels, receives measurements from network devices 210, and controls handovers from one BTS to another BTS.

Communication switches 220 may be provided to allow the terminating party, network device 230, to receive the communication from the calling party, another network device 230. The communication switches 220 may be maintained by a LEC that may access the CNAM provider 260. Accordingly, the communication switches may allow the LEC to update the CNAM entries associated with the calling party, e.g., network device 230.

Network device 230 communicates with a terminating party, e.g. another network device 230, over the network 210 and via the communication switches when necessary. Network device 230 executes a CANDE client that detects the caller identifier information provided to the terminating party. In one embodiment, the CANDE client may be part of an application executing on the network device 230. In an alternate embodiment, the CANDE client may an extension of the firmware on the network device 230.

The CANDE client may be configured with several default options that a user may reset, alter, or over-ride via a graphical user interface rendered by the network device 230. For instance, the default operational option may include, but is not limited to, the following: perform CNAM lookup on every communication initiated by the network device 230; perform CNAM lookup upon request by an application or the caller; and disable or shutdown CNAM lookup functionality. The network device 230 may also provide default delivery options, such as, deliver notification to network device 230 that initiated the communication only; deliver notification to all network devices associated with the caller; deliver notification via SMS; deliver notification via email, deliver notification via CANDE log file.

In one embodiment, the network device 230 may provide the caller with a graphical user interface that allows the caller to apply a flag to records having caller identifier information where the caller name is correct. The network device may, also, provide the caller with a graphical user interface that allows the caller to apply a flag to records having caller identifier information where the caller name is correct. The user may apply a flag such as green flag or yellow flag when the caller identifier information is acceptable. However, if the caller name is incorrect, the caller may update the caller name and transmit the updated caller identifier information to the CNAM server 240. The user may apply flags, such as, red to indicate that the caller identifier information is unacceptable. In turn, the CANDE server 240 may provide the CNAM provider with a CNAM update request having the corrected caller name. The CANDE client may receive a message from the CANDE server 240 that specifies whether the name was accepted or was not accepted by CNAM the provider 260. In certain embodiments, CANDE client may maintain a log file on the network device 210. The log file may include CNAM values and terminating party identifier, e.g. phone number, IP address, etc. The terminating party identifier may represent the terminating party that receives the communication request and the caller identifier information. Further, the network device 230 may utilize the log file to display and review the calls that were made by the caller.

The network device 230 may also be configured to trigger the CANDE client when specific events occur on the network device 230. For instance, the CANDE client 220 may be triggered on every communication initiated on the network device 230; the CANDE client 220 may be triggered on every communication initiated by a new caller only; the CANDE client may be triggered on every communication initiated to a new terminating party; the CANDE client 220 may be triggered only when CNAM record does not match the caller's CNAM profile CNAM; or the CANDE client 220 may be triggered only if the CNAM received from the CNAM provider is blank.

In some embodiments, during an outbound call, the CANDE client will capture the outbound number or address, and determine a LEC and serving CNAM provider associated with the terminating party having the outbound number or address. The CANDE client may utilize internal tables, e.g. cache, or industry sources, e.g., NPAC or CNARG, to identify the LEC, CNAM provider, and the caller identifier information. In turn, the caller identifier information associated with the caller that initiate the outbound call may be receive by the network device 230 via the selected delivery format, e.g., SMS or via email.

CANDE server 240 may receive the request to initiate a call from a CANDE client. The CANDE server 240 may check its local cache to determine whether the caller identifier information that will be provided to the terminating party was recently obtained from the CNAM provider 260. If the caller identifier information was recently obtained, the caller identifier information in the cached is obtained by the CANDE server 240. In turn, the CANDE server 240 transmits the cached caller identifier information to the network device 230.

If the caller identifier was not recently obtained, the CANDE server 240 may transmit a query to a registry having the outbound number or address of the terminating party. The registry may respond to the CANDE server 240 with the CNAM provider 260 associated with the terminating party. In turn, the CANDE server 240 may store the outbound number or address of the terminating party and the corresponding address of the CNAM provider 260 to the cache. The CANDE server 240 may utilize the address of the CNAM provider 260 to request a CNAM record that will be provided to the terminating party. The CNAM provider 260 transmits the caller identifier information to the CANDE server 240. The CANDE server 240 may forward the caller identifier information to the network device 230. In one embodiment, the CANDE server 240 may verify that the caller identifier information is valid. For instance, the CANDE server 240 may check the format of the caller identifier information to ensure that the proper data is provided. The caller identifier information may include caller name and caller number. When the caller identifier information is valid, it is stored in the local cache on the CANDE server 240.

Accordingly, CNAM server 240 is contacted by the network device 230. The network device 230 provides a request to initiate a call with a terminating party. The request from the network device 230 may include the caller name and outbound number or address for the terminating party. The request may also specify that the network device 230 would prefer to mirror the display at the terminating party in a graphical user interface rendered on the network device 230. In turn, the CNAM provider 260 associated with the terminating party is identified by the CANDE server 240 via a local cache or via a registry. The CNAM provider 260 receives the request to mirror the display at the terminating party and responds with the caller identifier information that will be provided to the terminating party.

If there is an error in the caller identifier information, the CANDE server 240 may automatically correct the error. Alternatively, the user of the network device 230 may request correction and the correction may occur via the CNAM provider 260 of the communication carrier providing network 210

Billing center 250 may generate bills for the user of the CANDE client. The bills may include a log of the number of changes or edits made to the CNAM record. In some embodiment, the user may be charged per edit. In other embodiments, the bills may include a log of the number of views or accesses of the CNAM records by the user of the CANDE client. The user may be charge per view of the CNAM record or per access of the CNAM record.

CNAM provider 260 transmits caller identifier information to a terminating party. The caller identifier information is associated with the network device 230 utilized by the caller that initiated the call to the terminating party. The CNAM provider 260 may include a database that stores the caller identifier information and the corresponding network device number or address. Accordingly, a CANDE server 240 that has identified the LEC or CNAM provider 260 of the terminating party associated with call will have access to the database to retrieve the caller identifier information record for the terminating party.

The illustrated elements of the communication system 200 are meant to be exemplary in nature, and the various lower-level details of the elements are not elaborated on so as to not obscure the embodiments of the invention. Clearly, some of the elements may be absent in some embodiments of the invention, and additional elements not shown may also be part of communication system 200. Attempting to show all of the various elements of communication system 200 would obscure certain novel aspects, and we will refrain from such elaboration at least for the sake of brevity.

In one embodiment, the network device may detect an error in the caller identifier information. The network device may request a correction to the caller identifier information. In turn, the CNAM record stored by the CNAM provider is updated in accordance with the request received from the network device. The network device may receive a notification on whether the correction was successful.

Figure 3A:
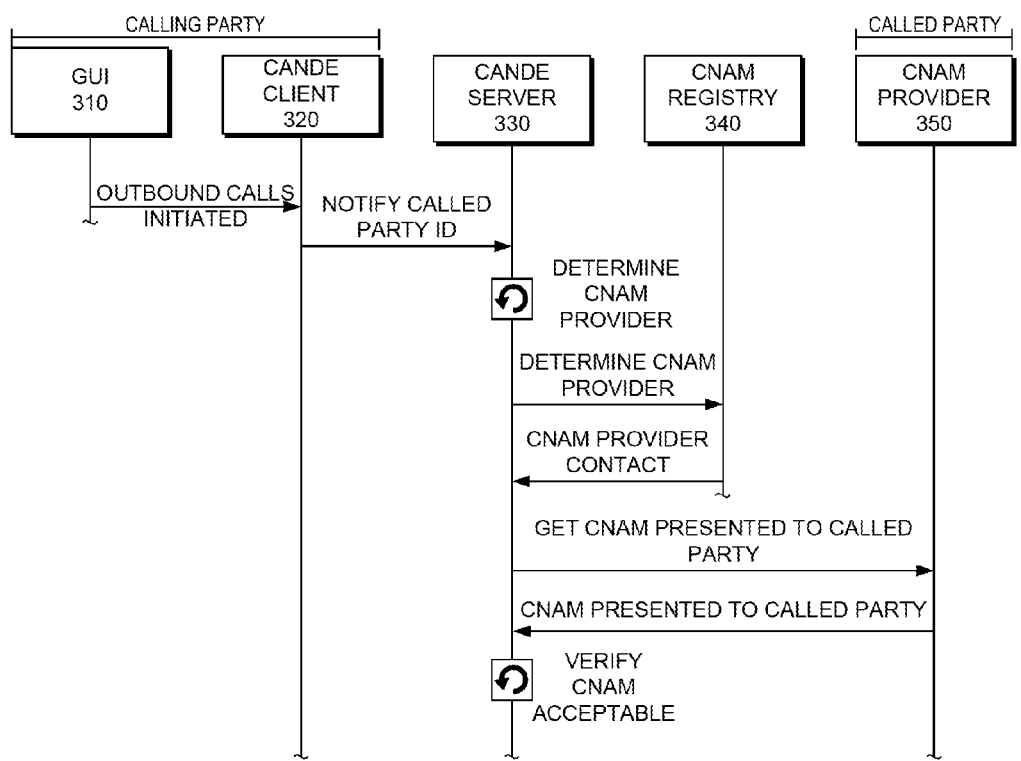
FIGS. 3A and 3B depict messaging diagrams illustrating the communications exchanged in the communication system in accordance with embodiments of the invention.
Figure 3B:
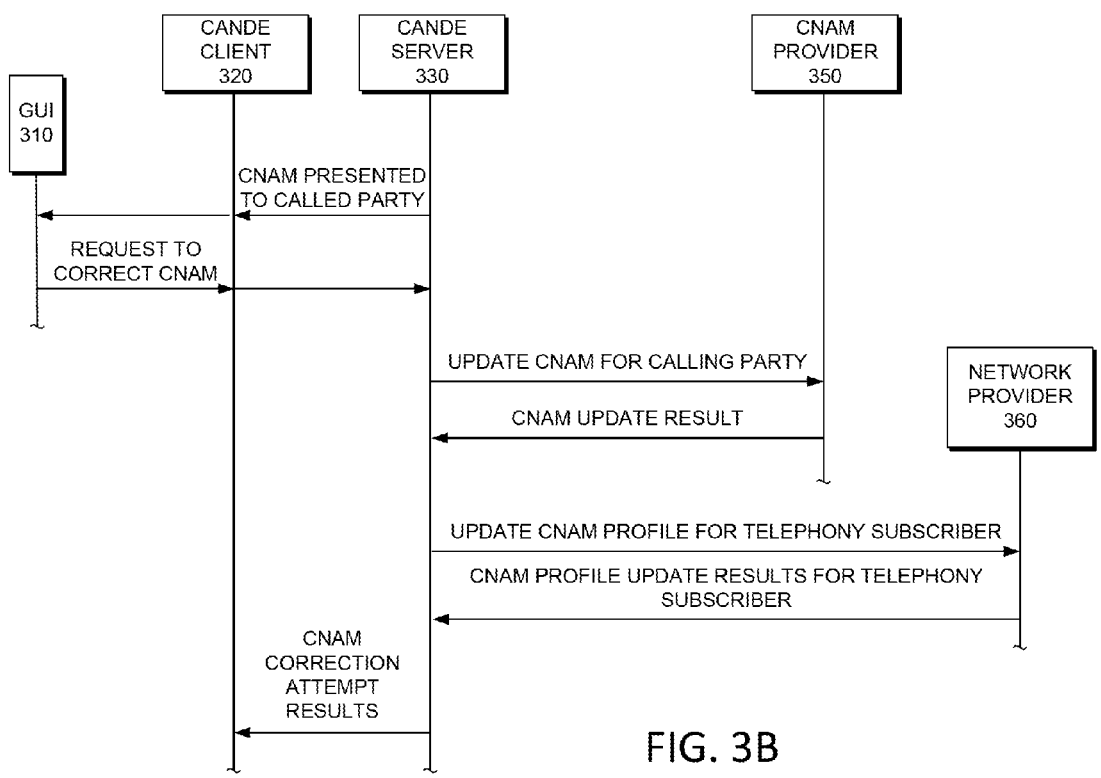

FIGS. 3A and 3B depict messaging diagrams illustrating the communications exchanged in the communication system in accordance with embodiments of the invention. The communication system includes calling party 310, 320; CANDE server 330; CNAM registry 340; CNAM provider 350, e.g. called party; the calling party 310, 320, or network device, includes GUI 310 and CANDE client 320.

The caller may utilize GUI 310 of the network device to initiate an outbound communication to a called party. The CANDE client 320 processes the request which includes the outbound number or address of the called party. Also, the CANDE client 320 transmits the request to initiate a communication with the called party.

The CANDE server 330 receives the request from the CANDE client 320. The request may include the outbound number or address of the called party. The CANDE server 330 determines the CNAM provider 350 associated with the called party. In one embodiment, the CANDE server 330 checks its local cache for the address of the CNAM provider 350. When the local cache does not include an address for the appropriate CNAM provider 350, the CANDE server 330 transmits a request to locate the CNAM provider 350 for the called party.

The request transmitted by the CANDE server 330 is received by CNAM registry 340. The CNAM registry 340 stores a CNAM provider address for phone numbers or addresses assigned to the network devices. The CNAM registry 340 responds to the request and includes the address for the CNAM provider 350 that corresponds to the called party.

The CANDE server 330 receives the address for the CNAM provider 350. The CANDE server 330 requests that CNAM provider 350 transmit a mirror of the caller identifier information that will be presented to the called party. The CANDE server 330, in certain embodiments, includes the phone numbers or addresses of the calling party and the called party. In turn, the CANDE server 330 receives from the CNAM provider 350 a copy of the caller identifier information that will be transmitted to the called party. In turn, the CANDE server 3330 may verify that CNAM record is valid. For instance, the CANDE sever 330 may check the caller identifier information to ensure that the data is formatted properly and that the data is appropriately labeled. If the data is not acceptable, the CANDE server 330 may inform the CANDE client 320 that no information is available from the CNAM provider 350. If the data is valid, the CANDE server 330 transmits the CNAM record received from the CNAM provider 350 to the CANDE client 320.

The CANDE client 320 receives the CNAM record and renders the caller identifier information in GUI 310 on the network device. In one embodiment, the CANDE client 320 may automatically determine whether an error is present in the caller identifier information. The CANDE client 320 may compare the caller name included in a profile of the network device to the name in the caller identifier information. If the name does not match, the CANDE client 320 may request a change in the CNAM record to include the caller name included in the profile for the network device. In an alternate embodiment, the user may request a change in the CNAM record. The caller specifies the new caller name to replace the caller identifier information received from the CNAM provider 350. The caller may utilize GUI 310 to request the change to the CNAM record.

In turn, the CANDE client 320 forwards the update request to the CANDE server 330. The CANDE server 330 locates the CNAM provider 350 and transmits the update request to the CNAM provider 350. The CNAM provider 350 receives the update request and changes the caller identifier information associated with the calling party. The CNAM provider 350 transmits an acknowledgement to the CANDE server 330 when the update to the CNAM record was successful. In turn, the CANDE server 330 notifies the CANDE client 320 that the update was successful. If the update is not successful, an error message may be delivered to the CANDE client 320.

In some embodiments, the CANDE server 330 transmits the update request to the communication provider 360. The communication provider 360 receives the update request and modifies a profile associated with the calling party based on the changes included in the request. The communication provider 360 transmits an acknowledgement to the CANDE server 330 when the update to the profile was successful. In turn, the CANDE server 330 notifies the CANDE client 320 that the update was successful. If the update is not successful, an error message may be delivered to the CANDE client 320.

In yet another embodiment, the network device is also configured to detect and tag errors in the CNAM records. The network device may receive caller identifier information associated with an outbound call. The caller identifier information is checked for errors. When errors are found, the CNAM record may be tagged for update.

Figure 4:
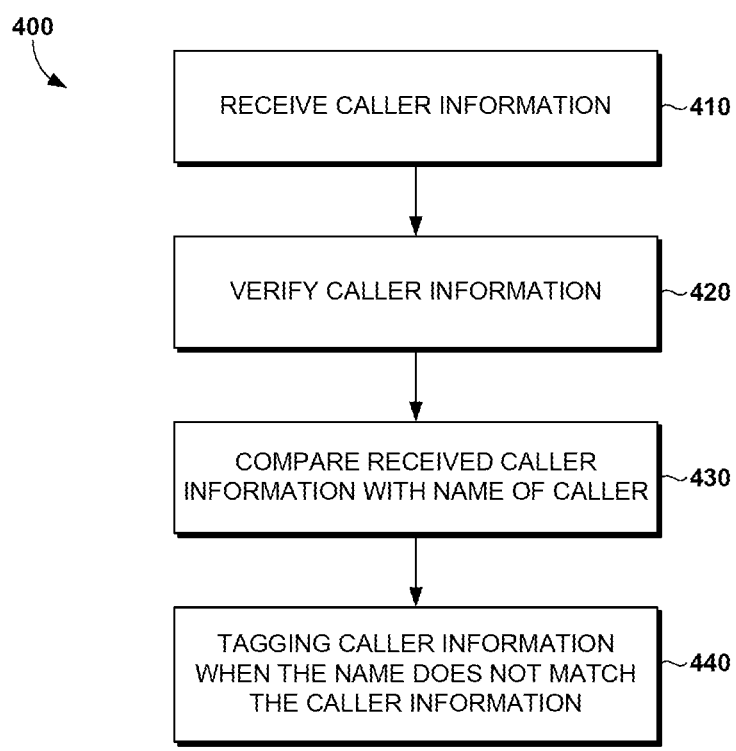
FIG. 4 depicts a flow diagram illustrating a method for detecting an error in the CNAM records in accordance with embodiments of the invention.

FIG. 4 depicts a flow diagram 400 illustrating a method for detecting an error in the CNAM records in accordance with embodiments of the invention. The method may be executed locally by the network device or by the CANDE server. The network device is one of a: laptop, netbook, wireless phone, etc. In step 410, the network device receives caller identifier information that will be displayed to a terminating endpoint. The network device may verify the caller identifier information, in step 420.

In turn, the network device, in step 430, compares the received caller identifier information with a name associated with the caller that initiated an outbound communication with the terminating endpoint. In one embodiment, the name associated with the caller is stored in a subscriber profile. The subscriber profile may be maintained by a communication provider. A notification that the caller identifier information does not match the name associated with the caller may be rendered for display to the caller.

In step 440, the network device may tag the caller identifier when the name associated with the caller does not match the caller identifier information. In turn, the caller may specify another name to replace the name included in the caller identifier information when there is no match. The network device may cause the CNAM provider to change the caller identifier information, when the name included in the caller identifier information from the CNAM record does not match the name associated with the caller or the name in the subscriber profile for the network device that initiated the communication. In one embodiment, the name included in the caller identifier information is changed to the name associated with the caller. In an alternate embodiment, the caller may generate a request to change the caller identifier that includes an updated name. The network device may determine whether the caller requests a change to the caller identifier information. If the caller requests a change, the CNAM provider and communication provider may both be updated to reflect the change requested by the caller.

In summary, a CNAM client on the network device or a CANDE server allows caller to receive caller identifier information that will be displayed to a terminating party. The caller identifier information is checked to determine whether the caller name matches the name associated with the network device or the caller. When the comparison indicates that the caller identifier information fails to match the caller name, the CNAM client may automatically issue an update request to correct the CNAM record stored by the CNAM provider. In other embodiments, a subscriber profile may also be updated when the caller requests an update to the subscriber profile maintained by the communication provider and an update to CNAM record.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The technology claimed is:

1. A computer implemented method to manage caller identifiers, the method comprising:
   verifying the caller identifier information;
   comparing the received caller identifier information with a name associated with the caller received from a profile of a network device maintained by a communication provider, wherein the network device is one of one or more network devices associated with the caller, and wherein the caller identifier information and the name associated with the caller are received from separate sources;
   generating a notification when the caller identifier information does not match the name associated with the caller, wherein the notification indicates that that the caller identifier information does not match the name associated with the caller, and wherein the notification is delivered to the one or more network devices associated with the caller;
   providing a graphical user interface having at least two flags for the caller identifier information, wherein each flag is represented with a different color and the flags comprise: an acceptable flag and an unacceptable flag;
   tagging the caller identifier information with one of the at least two flags, when the name associated with the caller does not match the caller identifier information, to obtain recent names associated with the caller that replace the caller identifier information, wherein the recent names associated with the caller are obtained from one or more of the profiles of the one or more network devices and a replacement name provided by the caller;

generating a request, at the caller, to replace the caller identifier information stored at the CNAM registry if the name associated with the caller does not match the caller identifier information; and authorizing a payment transaction corresponding to the request to replace the caller identifier information received from the caller.

2. The method of claim 1, further comprising: issuing, by the CNAM registry, an update request to correct the record stored by a CNAM provider.

3. A server device, the server device comprising:

one or more processors configured to receive a minor copy of caller identifier information that will be displayed to a terminating endpoint of an outbound call initiated by a caller, to verify the caller identifier, to compare the received caller identifier information with a name associated with the caller in a profile of a network device maintained by a communication provider, wherein the network device is one of one or more network devices associated with the caller, and wherein the caller identifier information and the name associated with the caller are received from separate sources, to transmit a notification to one or more network devices associated with the caller indicating that the caller identifier information does not match the name associated with the caller; to provide a graphical user interface having at least two flags for the caller identifier information, wherein each flag is represented with a different color and the flags comprise: an acceptable flag and an unacceptable flag; and to tag with one of the at least two flags, the caller identifier when the name associated with the caller does not match the caller identifier information, for update to recent names corresponding to the caller, wherein a caller's requests to change the caller identifier information that will be displayed to the terminating endpoint are billed to the caller.

4. The server device of claim 3, wherein the name associated with the caller is stored in a subscriber profile.

5. The server device of claim 3, wherein the caller specifies another name to replace the name included the caller identifier information.

6. The server device of claim 3, further comprising:

determining, by the one or more processors, whether the caller requests a change to the caller identifier information.

7. The server device of claim 3, further comprising:

changing, by the one or more processors, the caller identifier information, when the name included in the caller identifier information does not match the name associated with the caller.

8. The server device of claim 3, wherein a bill to the caller includes a cost for each change to the caller identifier information.

9. A server device, the server device comprising:

one or more processors configured to receive caller identifier information that will be displayed to a terminating endpoint, to verify the caller identifier information, to compare the received caller identifier information with a name associated with the received from a profile of a network device maintained by a communication provider, wherein the caller identifier information and the name associated with the caller are received from separate sources; to transmit, a notification to one or more network devices associated with the caller indicating that the caller identifier information does not match the name associated with the caller; to provide a graphical user interface having at least two flags for the caller identifier information, wherein each flag is represented with a different color and the flags comprise an acceptable flag that is represented by green and an unacceptable flag that is represented by red;

and to tag with one of the at least two flags, the caller identifier when the name associated with the caller does not match the caller identifier information, for update to recent names corresponding to the caller, wherein a caller's requests to change the caller identifier information that will be displayed to the terminating endpoint are billed to the caller.

10. The server device of claim 9, wherein the name associated with the caller is stored in a subscriber profile.

11. The server device of claim 9, wherein the caller specifies another name to replace the name included the caller identifier information.

12. The server device of claim 9, further comprising:

determining, by the one or more processors, whether the caller requests a change to the caller identifier information.

13. The server device of claim 9, further comprising:

receiving, by the one or more processors, a request to change the caller identifier.

14. The server device of claim 9, further comprising:

changing, by the one or more processors, the caller identifier information, when the name included in the caller identifier information does not match the name associated with the caller.

15. The server device of claim 9, further comprising: locating the caller identifier provider.

16. The server device of claim 15, wherein locating the caller identifier provider comprises one of: searching for terminating endpoints and data for providers corresponding to the terminating endpoints, or transmitting a query to a provider registry; and receiving provider information from the registry.

\* \* \* \* \*